US008726990B2

(12) United States Patent
Karcher et al.

(10) Patent No.: US 8,726,990 B2
(45) Date of Patent: May 20, 2014

(54) LOST-CIRCULATION MATERIAL MADE FROM A RECYCLED CERAMIC

(75) Inventors: Jeffery D. Karcher, Duncan, OK (US); Rickey Lynn Morgan, Duncan, OK (US); James R. Benkley, Duncan, OK (US); Chad Brenneis, Marlow, OK (US)

(73) Assignee: Halliburton Energy Services, Inc, Houston, TX (US)

( * ) Notice: Subject to any disclaimer, the term of this patent is extended or adjusted under 35 U.S.C. 154(b) by 147 days.

(21) Appl. No.: 13/267,944

(22) Filed: Oct. 7, 2011

(65) Prior Publication Data

US 2013/0087331 A1  Apr. 11, 2013

(51) Int. Cl.
| E21B 43/22 | (2006.01) |
| E21B 33/13 | (2006.01) |
| C09K 8/04 | (2006.01) |
| C09K 8/50 | (2006.01) |

(52) U.S. Cl.
USPC ........ 166/279; 166/285; 166/300; 166/305.1; 175/72; 507/140; 507/269

(58) Field of Classification Search
None
See application file for complete search history.

(56) References Cited

U.S. PATENT DOCUMENTS

| 3,042,608 A | 7/1962 | Morris |
| 6,508,306 B1 | 1/2003 | Reddy et al. |
| 6,861,392 B2 | 3/2005 | Shaarpour |
| 6,881,708 B2 | 4/2005 | Reddy et al. |
| 6,902,002 B1 | 6/2005 | Chatterji et al. |
| 7,055,603 B2 | 6/2006 | Caveny et al. |
| 7,066,285 B2 | 6/2006 | Shaarpour |
| 7,086,466 B2 | 8/2006 | Roddy |
| 7,229,492 B2 | 6/2007 | Chatterji et al. |
| 7,284,611 B2 | 10/2007 | Reddy et al. |
| 7,297,208 B2 | 11/2007 | Caveny et al. |
| 7,534,744 B2 | 5/2009 | Shaarpour |
| 7,560,419 B2 | 7/2009 | Fang et al. |
| 7,612,021 B2 | 11/2009 | Chatterji et al. |
| 7,776,797 B2 | 8/2010 | Allin et al. |
| 2008/0103065 A1* | 5/2008 | Reddy et al. ............... 507/143 |
| 2008/0196628 A1 | 8/2008 | Santra et al. |
| 2011/0220349 A1* | 9/2011 | Dakin ...................... 166/250.08 |
| 2013/0143777 A1* | 6/2013 | Wang ......................... 507/204 |

OTHER PUBLICATIONS

White, Lost-Circulation Materials and Their Evaluation, 352-59.
Howard, An Analysis and the Control of Lost Circulation, Petroleum Transactions Aime, 1951, 192, 171-82.
Kumar et al, Wellbore Strengthening: The Less-Studied Properties of Lost-Circulation Materials, 2010, Society of Petroleum Engineers 133484, 1-13.
Smith, Cementing, 1990, 1-5.
FlexPlug Service, Baroid Fluid Services, 2008, 1-4.
Stop-Frac, Baroid Fluid Services, 2005, 1-2.
Hydro-Plug Lost Circulation Plug, Baroid Fluid Services, 2008, 1-2.
EZ-Plug Lost Circulation Material, Baroid Fluid Service, 2005, 1.
Barofibre Lost Circulation and Seepage, Baroid Fluid Services, 2007, 1-2.
Fuse-It, Baroid Fluid Services, 2006, 1-2.
Wellbore Stress Management Service, Baroid Fluid Services, 2006, 1-2.
Engineered WellSET Treatment Service Helps Prevent Lost Circulation by Strengthening the Wellbore, Baroid Fluid Services, 2007, 1-2.
Duo-Squeeze H, Baroid Fluid Services, 2008, 1-2.
Steelseal, Wellbore Stress Management, 2010, 1-2.

* cited by examiner

*Primary Examiner* — Zakiya W Bates
(74) *Attorney, Agent, or Firm* — Craig W. Roddy; Sheri Higgins Law; Sheri Higgins

(57) ABSTRACT

A composition comprises: a treatment fluid comprising a lost-circulation material, wherein the lost-circulation material comprises a ceramic, and wherein the lost-circulation material has a median particle size in the range from about 0.001 millimeters to about 25.4 millimeters. According to another embodiment, a composition comprises: the treatment fluid comprising a lost-circulation material, wherein the lost-circulation material comprises a ceramic, and wherein the median particle size and the concentration of the lost-circulation material is selected such that the treatment fluid has a sealing pressure of at least 50 psi (0.3 MPa). A method of eliminating or reducing lost circulation from a well comprises: introducing the treatment fluid into at least a portion of the well.

24 Claims, No Drawings

LOST-CIRCULATION MATERIAL MADE FROM A RECYCLED CERAMIC

TECHNICAL FIELD

A treatment fluid containing a lost-circulation material and methods of use are provided. In certain embodiments, the lost-circulation material is made from a recycled material. In some embodiments, the recycled material is a ceramic material.

SUMMARY

According to an embodiment, a method of eliminating or reducing lost circulation from a well comprises: introducing a treatment fluid into at least a portion of the well, wherein the treatment fluid comprises: a lost-circulation material, wherein the lost-circulation material comprises a ceramic, and wherein the lost-circulation material has a median particle size in the range from about 0.001 millimeters to about 25.4 millimeters.

According to another embodiment, a method of eliminating or reducing lost circulation from a well comprises: introducing a treatment fluid into at least a portion of the well, wherein the treatment fluid comprises: a lost-circulation material, wherein the lost-circulation material comprises a ceramic, and wherein the median particle size and the concentration of the lost-circulation material is selected such that the treatment fluid has a sealing pressure of at least 50 psi (0.3 MPa).

According to another embodiment, a composition comprises: a treatment fluid comprising a lost-circulation material, wherein the lost-circulation material comprises a ceramic, and wherein the lost-circulation material has a median particle size in the range from about 0.001 millimeters to about 25.4 millimeters.

DETAILED DESCRIPTION

As used herein, the words "comprise," "have," "include," and all grammatical variations thereof are each intended to have an open, non-limiting meaning that does not exclude additional elements or steps.

As used herein, a "fluid" is a substance having a continuous phase that can flow and conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A colloid can be: a slurry, which includes a continuous liquid phase and undissolved solid particles as the dispersed phase; an emulsion, which includes a continuous liquid phase and at least one dispersed phase of immiscible liquid droplets; or a foam, which includes a continuous liquid phase and a gas as the dispersed phase.

Oil and gas hydrocarbons are naturally occurring in some subterranean formations. A subterranean formation containing oil or gas is sometimes referred to as a reservoir. A reservoir may be located under land or off shore. In order to produce oil or gas, a wellbore is drilled into a reservoir or adjacent to a reservoir.

A well can include, without limitation, an oil, gas, water, or injection well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within about 100 feet of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore which can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

A wellbore is formed using a drill bit. A drill string can be used to aid the drill bit in drilling through the subterranean formation to form the wellbore. The drill string can include a drilling pipe. During drilling operations, a drilling fluid, sometimes referred to as a drilling mud, may be circulated downwardly through the drilling pipe, and back up the annulus between the wellbore and the outside of the drilling pipe. The drilling fluid is generally a slurry or an emulsion and contains a liquid continuous phase. The drilling fluid performs various functions, such as cooling the drill bit, maintaining the desired pressure in the well, and carrying drill cuttings upwardly through the annulus between the wellbore and the drilling pipe.

During well completion, it is common to introduce a cement composition into a portion of an annulus in a wellbore. For example, in a cased-hole wellbore, a cement composition can be placed into and allowed to set in the annulus between the wellbore and the casing in order to stabilize and secure the casing in the wellbore. By cementing the casing in the wellbore, fluids are prevented from flowing into the annulus. Consequently, oil or gas can be produced in a controlled manner by directing the flow of oil or gas through the casing and into the wellhead. Cement compositions can also be used in primary or secondary cementing operations, well-plugging, or gravel packing operations. As used herein, a "cement composition" is a mixture of at least cement and water. A cement composition can include additives. As used herein, the term "cement" means an initially dry substance that develops compressive strength or sets in the presence of water. A cement composition is generally a slurry in which the water comprises the continuous liquid phase of the slurry and the cement, and other undissolved solids make up the dispersed phase of the slurry.

A treatment fluid, such as a drilling fluid or cement composition, that contains a liquid continuous phase can create lost circulation. Lost circulation means that an undesirable portion of the liquid continuous phase of a fluid flows into the subterranean formation instead of returning to the surface. In an ideal drilling situation, the drilling fluid is pumped through a tubing string and returns to the surface via an annulus. The drilling fluid is generally pumped at or above the hydrostatic pressure of the subterranean formation. The pressure of the drilling fluid, being greater than or equal to the pressure of the formation, helps prevent the formation from caving into the newly-formed wellbore, and it also helps prevent the oil or gas from prematurely entering the wellbore. In an ideal cementing operation, the cement composition is placed in the portion of the well to be cemented. The cement composition remains in the portion of the well until the composition eventually sets.

However, during lost circulation of a drilling fluid, the liquid continuous phase of the fluid can enter the subterranean formation. The liquid can flow into the formation, for example, via fractures or fissures in the formation. If a sufficient amount of the liquid flows into the formation, then the total amount of pressure exerted on the formation by the fluid can decrease substantially. This decreased pressure can allow formation fluids, such as oil or gas, to prematurely enter the wellbore. The uncontrolled release of formation fluids is called a blow out. Another potential consequence to lost circulation for a drilling fluid is dry drilling. Dry drilling can damage the drill bit or the drill string, among other things.

During lost circulation of a cement composition, the liquid continuous phase of the composition can enter the subterranean formation. Because the cement in the composition requires water to hydrate and is what ultimately allows the composition to set, the loss of water to the formation can cause severe consequences to the cementing operation. For example, the cement composition may never set. If this occurs, a new cementing job will have to be performed. Removing the un-set cement composition and running a new cement job can cost time and money.

In order to overcome the problems associated with lost circulation, materials, commonly called a lost-circulation material ("LCM"), have been used. LCMs are generally non-swellable, granular-shaped substances. Generally, the LCM is included in the treatment fluid. As the treatment fluid is placed into the well, the LCM can eliminate or lessen the amount of fluid entering the formation. Traditionally, the particles of the LCM can build upon each other and form a bridge over highly-permeable areas of the formation. For example, if a fracture is present in the formation, then the particles of the LCM can form a non-porous bridge or layer over the fracture entrance near the wall of the wellbore. The bridge or layer can eliminate or reduce the amount of liquid entering the formation via the wellbore.

Recently, there has been a decrease in the availability of LCMs. There could be several reasons for the decrease in supply, including a decrease of raw materials used to manufacture LCMs, an increased cost for obtaining the raw materials, a decrease in the effectiveness of the LCM, or other reasons not listed. However, the demand for LCMs has not greatly diminished. Therefore, there is a need for an LCM that is low-cost, effective, and can be made from a readily-available supply of raw materials.

It has been discovered that recycled ceramic materials can be used as an LCM for wellbore treatment fluids. According to some reports, there is an estimated 12 million tons of waste glass generated in the United States (U.S.) each year. There are also other waste ceramic materials that are generated each year, such as ceramic roof shingles and toilets. The majority of the waste ceramic materials are not recycled and add to land fill problems across the U.S. Some programs recycle ceramic materials, for example, glass can be recycled and used to make new glass products. However, due to the large amount of waste ceramic materials generated each year, there is an abundant supply of waste ceramics that can be recycled as an LCM.

In order to function as an LCM, the particle size of the material can be adjusted to meet the specific conditions of the well. There have been several models developed to help determine the optimum particle size distribution of the material. The optimum particle size distribution is the size wherein the minimum amount of liquid is lost to the formation. One example of such a method is the Halliburton method. According to this method, the median particle size is selected to be equal to the estimated fracture width. In this manner, a sufficient amount of particles, both larger and smaller than the median size, are present to create the most effective bridge or seal.

Some of the advantages to using recycled ceramic materials as an LCM include: there is an abundant supply of ceramics; almost every state and major city has a supply of the ceramics, as such the cost of the ceramics can be relatively low due to decreased transportation costs; and the ceramics are an effective LCM.

If any test (e.g., flow loop or compressive strength) requires the step of mixing, then the substance is mixed according to the following procedures. For a cement composition, the water is added to a mixing container and the container is then placed on a mixer base. The motor of the base is then turned on and maintained at 4,000 revolutions per minute (rpm). The cement and any other ingredients are added to the container at a uniform rate in not more than 15 seconds (s). After all the cement and any other ingredients have been added to the water in the container, a cover is then placed on the container, and the cement composition is mixed at 12,000 rpm (+/−500 rpm) for 35 s (+/−1 s).

It is also to be understood that if any test (e.g., flow loop or compressive strength) requires the test be performed at a specified temperature and possibly a specified pressure, then the temperature and pressure of the substance is ramped up to the specified temperature and pressure after being mixed at ambient temperature and pressure. For example, the substance can be mixed at 71° F. (22° C.) and 1 atm (0.1 MPa) and then placed into the testing apparatus and the temperature of the substance can be ramped up to the specified temperature. As used herein, the rate of ramping up the temperature is generally in the range of not more than about 3° F./min to about 5° F./min (about 1.67° C./min to about 2.78° C./min). After the substance is ramped up to the specified temperature and possibly pressure, the substance is maintained at that temperature and pressure for the duration of the testing.

As used herein, the "flow loop" test is conducted as follows. The substance is mixed. The substance is then flowed through a hollow, tubular loop fitted with a slot of a specified width and or gap. As used herein, the "sealing time" is the time it takes for the slurry to stop flowing through the slot. When the slurry stops flowing through the slot, the pressure on the slot is gradually increased. It is to be understood, that the capability of the instrument may not exceed a pressure of 100 psi (0.7 MPa). Moreover, even though an instrument may be capable of placing a pressure of greater than 100 psi (0.7 MPa) on the seal, the results may not be reliable. Therefore, the specified pressure is meant to take into account the capabilities of the instrument as well as the reliability of the results. As long as the seal does not break, the pressure is then held at that pressure for a total of 15 seconds(s). As used herein, the "sealing pressure" is the pressure at which the slurry maintains a seal and does not allow fluid to flow through the slot for a time period of at least 15 s. It is to be understood that the "sealing pressure" may be higher than the stated pressure. For example, if the instrument is only capable of applying 100 psi to the seal, then the actual sealing pressure may be much higher than 100 psi, but it is not possible to test for the maximum pressure the seal can withstand without breaking. As a result, the "sealing pressure" is the maximum pressure at which the seal does not break within the confines of the testing instrument's limits.

According to an embodiment, a method of eliminating or reducing lost circulation from a well comprises: introducing a treatment fluid into at least a portion of the well, wherein the treatment fluid comprises: a lost-circulation material, wherein the lost-circulation material comprises a ceramic, and wherein the lost-circulation material has a median particle size in the range from about 0.001 millimeters to about 25.4 millimeters.

According to another embodiment, a method of eliminating or reducing lost circulation from a well comprises: introducing a treatment fluid into at least a portion of the well, wherein the treatment fluid comprises: a lost-circulation material, wherein the lost-circulation material comprises a ceramic, and wherein the median particle size and the concentration of the lost-circulation material is selected such that the treatment fluid has a sealing pressure of at least 50 psi (0.3 MPa).

According to another embodiment, a composition comprises: a treatment fluid comprising a lost-circulation material, wherein the lost-circulation material comprises a ceramic, and wherein the lost-circulation material has a median particle size in the range from about 0.001 millimeters to about 25.4 millimeters.

The discussion of preferred embodiments regarding the treatment fluid or any ingredient in the treatment fluid, is intended to apply to the composition embodiments and the method embodiments. Any reference to the unit "gallons" means U.S. gallons.

The treatment fluid can be a colloid. The treatment fluid can contain a liquid. The treatment fluid can include a liquid continuous phase. The liquid can comprise water. The water can be selected from the group consisting of freshwater, brackish water, saltwater, and any combination thereof. Alternatively, the liquid can comprise an oil. As used herein, the term "oil" means a liquid comprising a hydrocarbon when measured at a temperature of 71° F. (21.7° C.) and a pressure of one atmosphere. Examples of oil include, but are not limited to: crude oil; a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a suitable fractional distillate of crude oil is diesel oil. The saturated hydrocarbon can be an alkane or paraffin. The paraffin can be an isoalkane (isoparaffin), a linear alkane (paraffin), or a cyclic alkane (cycloparaffin). The unsaturated hydrocarbon can be an alkene, alkyne, or aromatic. The alkene can be an isoalkene, linear alkene, or cyclic alkene. The linear alkene can be a linear alpha olefin or an internal olefin. The liquid continuous phase can also include dissolved substances or undissolved solids.

According to an embodiment, the treatment fluid is an emulsion. According to another embodiment, the treatment fluid is a slurry. The treatment fluid can include a dispersed phase. Preferably, the dispersed phase of the treatment fluid includes the lost-circulation material ("LCM").

The LCM comprises a ceramic. As used herein, the term "ceramic" means an inorganic, nonmetallic solid prepared by the action of heat and then subsequent cooling. Ceramic materials may have a crystalline or semi-crystalline structure, or it may be amorphous (e.g., glass). As used herein the crystallinity of a substance is indicated by a melting point and/or by X-ray absorption peaks. A glass transition temperature (Tg) is indicative of the amorphous nature or presence of an amorphous region of a substance. A ceramic material can be porcelain or glass. As used herein, the term "porcelain" means a ceramic material made by heating raw materials, generally including clay in the form of kaolin, in a kiln to temperatures between 2,192° F. (1,200 C) and 2,552° F. (1,400° C.) and then cooling or allowing the material to cool. Examples of ceramics suitable for use as an LCM include, but are not limited to, bricks, pipes, floor and roof tiles, gas fire radiants, steel and glass making crucibles, and whitewares, such as tableware, wall tiles, pottery products, sanitary ware (e.g., toilets and bath tubs), and combinations thereof. According to an embodiment, the LCM is made from porcelain toilets. Preferably, the LCM comes from a recycled product. By way of example, if the LCM is made from porcelain toilets, then old toilets can be collected and then ground to the desired particle size for use as an LCM.

According to an embodiment, the LCM has a median particle size in the range of about 0.001 millimeters (mm) to about 25.4 mm. The LCM can also have a median particle size in the range from about 0.1 mm to about 22 mm, alternatively about 0.7 mm to about 13 mm. According to another embodiment, the median particle size of the LCM is selected such that the treatment fluid has a sealing pressure of at least 50 psi (0.3 MPa). The median particle size of the LCM can also be selected such that the treatment fluid has a sealing pressure of at least 100 psi (0.7 MPa). The median particle size of the LCM can also be selected such that the treatment fluid has a sealing pressure in the range of about 30 to about 100 psi (about 0.2 to about 0.7 MPa), alternatively about 50 to about 80 psi (about 0.3 to about 0.6 MPa). According to another embodiment, the median particle size of the LCM is selected such that the treatment fluid has a sealing pressure at the bottomhole pressure of the well. As used herein, the term "bottomhole" means the portion of the well to be treated.

According to an embodiment, the LCM is in a concentration of at least 0.1% weight by volume (wt/vol) of the treatment fluid. The LCM can be in a concentration in the range of about 0.1% wt/vol to about 30% wt/vol, alternatively about 2% wt/vol to about 25% wt/vol, alternatively about 3.5% wt/vol to about 19% wt/vol of the treatment fluid. According to another embodiment, the concentration of the LCM is selected such that the treatment fluid has a sealing pressure of at least 50 psi (0.3 MPa). The concentration of the LCM can also be selected such that the treatment fluid has a sealing pressure of at least 100 psi (0.7 MPa). The concentration of the LCM can also be selected such that the treatment fluid has a sealing pressure in the range of about 50 psi to about 100 psi (about 0.3 to about 0.7 MPa). According to another embodiment, the concentration of the LCM is selected such that the treatment fluid has a sealing pressure at the bottomhole pressure of the well.

The LCM can have a specific gravity in a range from about 1 to about 4, alternatively from about 2 to about 3. Preferably, the LCM has a specific gravity in the range from about 1.5 to about 2.5.

The treatment fluid can have a sealing pressure of at least 50 psi (0.3 MPa), alternatively at least 80 psi (0.6 MPa), alternatively at least 100 psi (0.7 MPa). Preferably, the treatment fluid has a sealing pressure at the bottomhole pressure of the well. The treatment fluid can have a sealing time of less than 10 minutes (min.), alternatively less than 5 min., alternatively less than 3 min. The treatment fluid can be any colloidal fluid having a liquid continuous phase. The treatment fluid can be any fluid where lost circulation from a well into a subterranean formation might occur. Examples of the treatment fluid include, but are not limited to, a drilling fluid and a cement composition.

The method embodiments include the step of introducing the treatment fluid into at least a portion of the well. The step of introducing is for the purpose of at least one of the following: drilling operations; well completion; foam cementing; primary or secondary cementing operations; well-plugging; squeeze cementing; and gravel packing. If the treatment fluid is a cement composition, then the cement composition can be in a pumpable state before and during introduction into the well. In one embodiment, a subterranean formation is penetrated by the well. The well can be, without limitation, an oil, gas, water, or injection well. According to another embodiment, the well includes an annulus. According to another embodiment, the step of introducing includes introducing the cement composition into a portion of the annulus.

If the treatment fluid is a cement composition, then the method embodiments can further include the step of allowing the cement composition to set. The step of allowing can be after the step of introducing the treatment fluid into the well. The method embodiments can also include the additional steps of perforating, fracturing, or performing an acidizing treatment, after the step of allowing.

The well can have a bottomhole temperature in the range of about 35° F. to about 800° F. (about 1.7° C. to about 426.7° C.).

If the treatment fluid is a cement composition, then the treatment fluid can further include cement. The cement can be Class A cement, Class C cement, Class G cement, Class H cement, fly ash, slag, volcanic ash, and any combination thereof. Preferably, the cement is Class G cement or Class H cement.

The treatment fluid can further include an additive. Examples of an additive include, but are not limited to, a filler, a fluid loss additive, a set retarder, a friction reducer, a strength-retrogression additive, a defoaming agent, a high-density additive, a set accelerator, a mechanical property enhancing additive, a lost-circulation material, a filtration-control additive, a thixotropic additive, a nano-particle, and combinations thereof.

The treatment fluid can include a filler. Suitable examples of fillers include, but are not limited to, fly ash, sand, clays, and vitrified shale. Preferably, the filler is in a concentration in the range of about 5% to about 50% by weight of the cement (bwc).

The treatment fluid can include a fluid loss additive. Suitable examples of commercially-available fluid loss additives include, but are not limited to, HALAD®-23, HALAD®-344, HALAD®-413, and HALAD®-300, marketed by Halliburton Energy Services, Inc. Preferably, the fluid loss additive is in a concentration in the range of about 0.05% to about 10% bwc.

The treatment fluid can include a set retarder. Suitable examples of commercially-available set retarders include, but are not limited to, HR®-4, HR®-5, HR®-6, HR®-12, HR®-20, HR®-25, SCR-100™, and SCR-500™, marketed by Halliburton Energy Services, Inc. Preferably, the set retarder is in a concentration in the range of about 0.05% to about 10% bwc.

The treatment fluid can include a friction reducer. Suitable examples of commercially-available friction reducers include, but are not limited to, CFR-2™, CFR-3™, CFR-5LE™, CFR-6™, and CFR-8™, marketed by Halliburton Energy Services, Inc. Preferably, the friction reducer is in a concentration in the range of about 0.1% to about 10% bwc.

The treatment fluid can include a strength-retrogression additive. Suitable examples of commercially-available strength-retrogression additives include, but are not limited to, SSA-1™ and SSA-2™, marketed by Halliburton Energy Services, Inc. Preferably, the strength-retrogression additive is in a concentration in the range of about 5% to about 50% bwc.

Commercially-available examples of other additives include, but are not limited to, High Dense® No. 3, High Dense® No. 4, Barite™, Micromax™, Silicalite™, WellLife® 665, WellLife® 809, WellLife® 810, and Channel Seal™ Fluid, marketed by Halliburton Energy Services, Inc.

In one embodiment, the treatment fluid has a density of at least 10 pounds per gallon (ppg) (1.2 kilograms per liter (kg/l)). In another embodiment, the treatment fluid has a density of at least 14 ppg (1.7 kg/l). In another embodiment, the treatment fluid has a density in the range of about 14 ppg to about 20 ppg (about 1.7 to about 2.4 kg/l).

EXAMPLES

To facilitate a better understanding of the preferred embodiments, the following examples of certain aspects of the preferred embodiments are given. The following examples are not the only examples that could be given according to the preferred embodiments and are not intended to limit the scope of the invention.

For the data contained in the following tables, the concentration of any ingredient in a cement composition can be expressed as pounds per sack of cement (abbreviated as "lb/sk") or percent by weight of the cement (abbreviated as "% bwc").

The cement compositions were mixed and tested according to the procedure for the specific test as described in The Detailed Description section above.

Table 1 contains flow loop testing data with various slot sizes for 11 different cement composition treatment fluids having a density of 16.4 pounds per gallon (1.97 kg/L). Each of the cement compositions contained deionized water at a concentration of 38% bwc and Texas Lehigh Class H cement. The cement compositions contained a lost-circulation material of gilsonite, ryolite, PHENOSEAL™, or porcelain toilets. The toilets were ground and had a specific gravity of 2.53. The toilets were screened through various mesh sieves and had the following particle distribution: #10 mesh sieve at 3.88%, #20 mesh sieve at 32.32%, #40 mesh sieve at 25.5%, #140 mesh sieve at 31.9%, and below a #140 mesh sieve at 6.4%. As can be seen in Table 1, the cement compositions containing Gilsonite did not create a seal for at least the first 3 minutes of flowing the slurry through the loop. The sealing time appears to be related to the concentration of the porcelain toilet LCM and the slot size. For example, comparing compositions #8 and #9, for a given slot size of 5 mm, composition #9 at a concentration of 3 lb/sk did not create a seal. However, composition #8 at a concentration of 6 lb/sk did create a seal and had a sealing pressure of 20 psi. This indicates that the concentration can be varied depending on the anticipated opening in the wall of the wellbore. As can also be seen, an LCM of porcelain toilets had a comparable or lower sealing time compared to other LCMs, such as Gilsonite, Ryolite, and PHENOSEAL™. This indicates that recycled ceramic materials can be used as an effective lost-circulation material, while being lower in price compared to other LCMs.

TABLE 1

| Cement Composition | LCM | Concentration (lb/sk) | Slot Size (mm) | Sealing Time (min:sec) | Sealing Pressure (psi) |
| --- | --- | --- | --- | --- | --- |
| 1 | Gilsonite | 3 | 2 | None up to 3:00 | — |
| 2 | Gilsonite | 5 | 2 | None up to 3:00 | — |
| 3 | Ryolite | 5 | 2 | 0:10 | |
| 4 | Ryolite | 5 | 4 | 5:51 | |
| 5 | PHENOSEAL ™ | 5 | 3 | 1:00 | |
| 6 | Porcelain Toilet | 3 | 3 | 0:49 | 100 |

TABLE 1-continued

| Cement Composition | LCM | Concentration (lb/sk) | Slot Size (mm) | Sealing Time (min:sec) | Sealing Pressure (psi) |
|---|---|---|---|---|---|
| 7 | Porcelain Toilet | 3 | 4 | 2:39 | 100 |
| 8 | Porcelain Toilet | 6 | 5 | 1:23 | 20 |
| 9 | Porcelain Toilet | 3 | 5 | None up to 3:00 | — |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of eliminating or reducing lost circulation from a well comprising:
    introducing a treatment fluid into at least a portion of the well, wherein the treatment fluid comprises:
        a lost-circulation material,
            wherein the lost-circulation material comprises a ceramic,
            wherein the lost-circulation material is made from a recycled product,
            wherein the lost-circulation material has a specific gravity in a range from about 1 to about 4, and
            wherein the lost-circulation material has a median particle size in the range from about 0.001 millimeters to about 25.4 millimeters.

2. The method according to claim 1, wherein the ceramic is porcelain or glass.

3. The method according to claim 1, wherein the lost-circulation material is made from bricks, pipes, floor and roof tiles, gas fire radiants, steel and glass making crucibles, tableware, wall tiles, pottery products, sanitary ware, and combinations thereof.

4. The method according to claim 3, wherein the sanitary ware is a toilet or a bath tub.

5. The method according to claim 1, wherein the lost-circulation material has a median particle size in the range from about 0.7 millimeters to about 13 millimeters.

6. The method according to claim 1, wherein the lost-circulation material is in a concentration of at least 0.1% weight by volume of the treatment fluid.

7. The method according to claim 1, wherein the lost-circulation material is in a concentration in the range of about 3.5% to about 19% weight by volume of the treatment fluid.

8. The method according to claim 1, wherein the treatment fluid has a sealing time of less than 5 minutes.

9. The method according to claim 1, wherein the treatment fluid is a drilling fluid.

10. The method according to claim 1, wherein the treatment fluid is a cement composition.

11. The method according to claim 1, wherein the treatment fluid has a sealing pressure of at least 20 psi.

12. The method according to claim 1, wherein the treatment fluid has a sealing pressure of at least 100 psi.

13. A method of eliminating or reducing lost circulation from a well comprising:
    introducing a treatment fluid into at least a portion of the well, wherein the treatment fluid comprises:
        a lost-circulation material,
            wherein the lost-circulation material comprises a ceramic,
            wherein the lost-circulation material is made from a recycled product,
            wherein the lost-circulation material has a specific gravity in a range from about 1 to about 4, and
            wherein the median particle size and the concentration of the lost-circulation material is selected such that the treatment fluid has a sealing pressure of at least 50 psi (0.3 MPa).

14. The method according to claim 13, wherein the median particle size and the concentration of the lost-circulation material is selected such that the treatment fluid has a sealing pressure of at least 100 psi (0.7 MPa).

15. The method according to claim 13, wherein the median particle size and the concentration of the lost-circulation material is selected such that the treatment fluid has a sealing pressure in the range of about 50 to about 100 psi (about 0.3 to about 0.7 MPa).

16. The method according to claim 13, wherein the median particle size of the lost-circulation material is selected such that the treatment fluid has a sealing pressure at the bottomhole pressure of the well.

17. The method according to claim 13, wherein the concentration of the lost-circulation material is selected such that the treatment fluid has a sealing pressure at the bottomhole pressure of the well.

18. A composition comprising:
    a treatment fluid comprising a lost-circulation material,
        wherein the lost-circulation material comprises a ceramic,
        wherein the lost-circulation material is made from a recycled product,
        wherein the lost-circulation material has a specific gravity in a range from about 1 to about 4, and
        wherein the lost-circulation material has a median particle size in the range from about 0.001 millimeters to about 25.4 millimeters.

19. A method of eliminating or reducing lost circulation from a well comprising:
    introducing a treatment fluid into at least a portion of the well, wherein the treatment fluid comprises:
        a lost-circulation material,
            wherein the lost-circulation material comprises a ceramic, wherein the lost-circulation material is made from bricks, pipes, floor and roof tiles, gas fire radiants, steel and glass making crucibles, tableware, wall tiles, pottery products, sanitary ware, and combinations thereof, and wherein the lost-circulation material has a median particle size in the range from about 0.001 millimeters to about 25.4 millimeters.

20. A method of eliminating or reducing lost circulation from a well comprising:

introducing a treatment fluid into at least a portion of the well, wherein the treatment fluid comprises:

a lost-circulation material, wherein the lost-circulation material comprises a ceramic, wherein the lost-circulation material is made from a recycled product, and wherein the lost-circulation material has a median particle size in the range from about 0.001 millimeters to about 25.4 millimeters.

21. A method of eliminating or reducing lost circulation from a well comprising:

introducing a treatment fluid into at least a portion of the well, wherein the treatment fluid comprises:

a lost-circulation material, wherein the lost-circulation material comprises a ceramic, wherein the lost-circulation material is made from bricks, pipes, floor and roof tiles, gas fire radiants, steel and glass making crucibles, tableware, wall tiles, pottery products, sanitary ware, and combinations thereof, and wherein the median particle size and the concentration of the lost-circulation material is selected such that the treatment fluid has a sealing pressure of at least 50 psi (0.3 MPa).

22. A method of eliminating or reducing lost circulation from a well comprising:

introducing a treatment fluid into at least a portion of the well, wherein the treatment fluid comprises:

a lost-circulation material, wherein the lost-circulation material comprises a ceramic, wherein the lost-circulation material is made from a recycled product, and wherein the median particle size and the concentration of the lost-circulation material is selected such that the treatment fluid has a sealing pressure of at least 50 psi (0.3 MPa).

23. A composition comprising:

a treatment fluid comprising a lost-circulation material, wherein the lost-circulation material comprises a ceramic, wherein the lost-circulation material is made from bricks, pipes, floor and roof tiles, gas fire radiants, steel and glass making crucibles, tableware, wall tiles, pottery products, sanitary ware, and combinations thereof, and wherein the lost-circulation material has a median particle size in the range from about 0.001 millimeters to about 25.4 millimeters.

24. A composition comprising:

a treatment fluid comprising a lost-circulation material, wherein the lost-circulation material comprises a ceramic, wherein the lost-circulation material is made from a recycled product, and wherein the lost-circulation material has a median particle size in the range from about 0.001 millimeters to about 25.4 millimeters.

* * * * *